United States Patent
Kalman et al.

(10) Patent No.: US 6,844,690 B2
(45) Date of Patent: Jan. 18, 2005

(54) DC OFFSET COMPENSATOR

(75) Inventors: Gabor Kalman, Palos Verdes, CA (US); Colin Huggett, Torrance, CA (US)

(73) Assignee: Honeywell International Inc., Morristown, NJ (US)

( * ) Notice: Subject to any disclaimer, the term of this patent is extended or adjusted under 35 U.S.C. 154(b) by 274 days.

(21) Appl. No.: 10/155,184

(22) Filed: May 24, 2002

(65) Prior Publication Data

US 2003/0218441 A1 Nov. 27, 2003

(51) Int. Cl.$^7$ .............................................. H02P 7/80
(52) U.S. Cl. ........................ 318/100; 318/798; 318/799; 318/800; 318/801; 363/42; 363/48; 363/84; 363/89
(58) Field of Search ................................ 318/100, 798, 318/799, 800, 801, 430–434, 521; 363/42, 48, 84, 89

(56) References Cited

U.S. PATENT DOCUMENTS

| | | | | |
|---|---|---|---|---|
| 4,698,577 A | * | 10/1987 | Seymour et al. | 318/805 |
| 5,407,027 A | * | 4/1995 | Suzuki et al. | 187/277 |
| 5,450,306 A | | 9/1995 | Garces et al. | |
| 5,550,512 A | * | 8/1996 | Fukahori | 330/254 |
| 5,706,186 A | | 1/1998 | Blasko | |
| 5,949,204 A | | 9/1999 | Huggett et al. | |
| 6,021,052 A | | 2/2000 | Unger et al. | |
| 6,154,379 A | | 11/2000 | Okita | |
| 6,201,715 B1 | * | 3/2001 | Huggett et al. | 363/48 |
| 6,278,255 B1 | * | 8/2001 | Yoo et al. | 318/798 |

FOREIGN PATENT DOCUMENTS

DE           4114500          11/1991

OTHER PUBLICATIONS

International Search Report, Dec. 2, 2003.
P.K. Kovacs, *Transient Phenomena in Electrical Machines*, Elsevier Science Publishing Co. (1984).
Veenstra, M. et al. "PWM–control of multi–level voltage–source inverters", Power Electronics Specialists Conference, 2000, vol. 3, Jun. 18–23, 2000, pp. 1387–1393.

* cited by examiner

*Primary Examiner*—David Martin
*Assistant Examiner*—Tyrone Smith
(74) *Attorney, Agent, or Firm*—Oral Caglar, Esq.

(57) ABSTRACT

A dc offset compensator receives a three phase ac current signal as an input and provides a dc offset signal correction voltage as an output. The dc offset compensator comprises a processor configured to sample the ac current signal, generate a rotating vector (r) from the sample, extract a dc offset from the sample and to generate a dc offset signal correction voltage from the dc offset. A method of compensating for dc offset in a three phase ac current signal is also presented.

16 Claims, 5 Drawing Sheets

PHASE "a" CURRENT [A]

CORRECTION VOLTAGE [V]

PHASE "a" CURRENT [A]

DC OFFSET COMPENSATOR

BACKGROUND OF THE INVENTION

The present invention relates to an apparatus and method for eliminating dc offset in an ac circuit and, more particularly, to an apparatus and method which utilizes coordinate transformations and control loops to accomplish the foregoing.

DC offset is a problem that often occurs in ac electrical circuits. In particular, in an ac circuit that is subject to a dc offset, an ac voltage signal will fluctuate such that the sum of the positive and negative fluctuations within a particular period approximates a particular voltage value that is above or below zero. Accordingly, the ac voltage signal is said to be offset by that particular voltage value.

Several problems arise as a result of a dc offset in an ac electrical circuit. For example, in an electric motor that utilizes magnetic cores, the cores can become saturated by the magnetic fields caused by the circulating dc currents. Also, large amounts of unwanted dc current may be circulated through an ac electrical circuit in excess of, e.g., an electrical machine's or solid state component's allowable rating.

DC offsets may be caused naturally or may be man-made. Natural causes include the natural effect of the start up or initial period of a circuit that begins from zero current flow through the electrical components of the circuit to a steady state current flow through the circuit. During this initial period, the ac current flowing contains a dc offset. Since the decay of this offset has been found to follow a time-constant T=L/R, dc offset can persist over a long period in high-Q circuits where there is slow decay. Such long decay can, e.g., cause arcing in circuit breakers, unwanted dynamic forces in bus bars, and saturation of magnetic cores.

Man-made causes include improper matching of a modulation frequency with a fundamental voltage in inverters. In particular, when inverters are used to generate alternating voltages, a dc voltage is alternately switched between one of two or more voltage levels. This switching occurs at a frequency (referred to as the modulating frequency) that is higher than the fundamental voltage that the inverter is to produce. When the modulation frequency is other than an odd triplen of the fundamental voltage, the modulated signal includes unequal positive and negative voltages producing a dc offset voltage. Attempts have been made to use a synchronous modulating scheme to prevent creation of a signal having unequal positive and negative voltages. However, since the modulation frequency is now tied to the fundamental frequency of the motor frequency, which varies with drive speed, the carrier frequency must also vary in order to be synchronous with the modulation frequency. Such an arrangement has been found to reduce the effectiveness of electromagnetic interference filtering, and also reduces the response of the control loops, and increases the peak current that the inverter must provide.

In another example of a man-made cause, where a dc voltage supplied to a six-pulse inverter varies slightly in a periodic and/or a random fashion, the ac output of the inverter contains dc voltage which, in turn, can produce a sequentially recurring dc offset current. A traditional method for attempting to eliminate dc offset included filtering the fundamental frequency from the ac voltage signal leaving a signal representative of the dc offset. A problem arises in that filtering the fundamental frequency requires filters with large time constants resulting in very sluggish response.

Another attempt to alleviate dc offset is described in U.S. Pat. No. 5,407,027 in which an elevator control apparatus is disclosed as including a cancellation circuit which cancels dc offset voltage. The cancellation circuit has a current detector that, after the elevator arrives at a destination and the inverter is disabled, samples and stores the output signal of the current detector. Once the inverter is again operating, the stored output signal is then added to the current detector output signal supplied to a control circuit that controls the inverter. A major disadvantage of such an arrangement is that the cancellation circuit fails to correct the dc offset contained in the ac output signal of the inverter, as described above.

SUMMARY OF THE INVENTION

According to one aspect of the present invention, a dc offset compensator receives a three phase ac current signal as an input and provides a dc offset signal correction voltage as an output. The dc offset compensator comprises a processor configured to sample the ac current signal, generate a rotating vector (r) from the sample, extract a dc offset from the sample, and to generate a dc offset signal correction voltage from the dc offset.

In another aspect of the invention, a method of compensating for dc offset in a three phase ac current signal is provided. The method comprises the steps of: providing a sample of the ac current signal; generating a rotating vector (r) from the sample; extracting a dc offset from the sample; and removing the dc offset from the ac current signal.

These and other features, aspects and advantages of the present invention will become better understood with reference to the following drawings, description and claims.

BRIEF DESCRIPTION OF THE DRAWINGS

FIG. 5b is a vector diagram showing the variation in the phase "a" current of FIG. 5a;

FIG. 6b is a vector diagram showing the variation in the phase "a" current of FIG. 6a;

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

An improved apparatus and method is provided by the present invention that eliminates dc offset in an ac circuit. By doing so, the magnetic cores of transformers are prevented from becoming saturated by the magnetic fields caused by the circulating dc currents. Also, braking torques that are produced in ac machines as a result of dc circulating currents are eliminated. Further, by employing an embodiment of the present invention, large amounts of unwanted dc current will not circulate through an ac electrical circuit in excess of, e.g., an electrical machine's or solid state component's allowable rating. In a particular embodiment of the present invention, dc voltage supplied to a six-pulse inverter varying slightly in a periodic and/or random fashion, is fed a correction signal which greatly reduces, e.g., the output of a sequentially recurring dc offset current from the inverter. Also, the present invention provides an increased response of filters by using co-ordinate transformations and control loops that enable rapid extraction of a desired signal, such as the dc offset signal.

Figure 1:
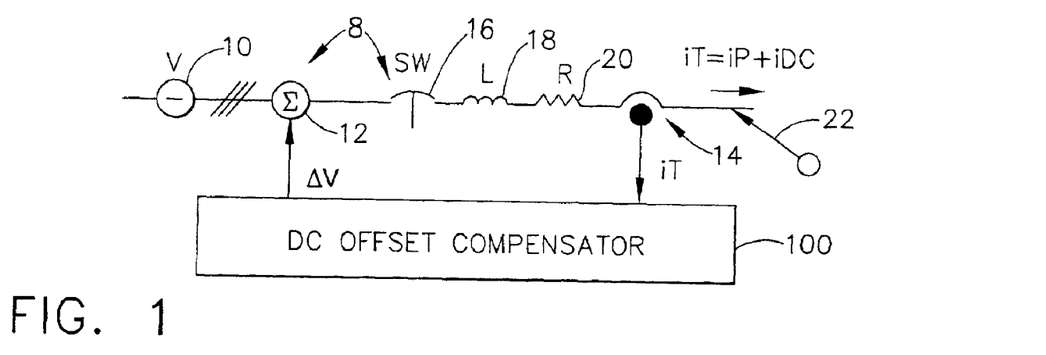
FIG. 1 is a schematic diagram of a dc offset compensator in accordance with an embodiment of the present invention connected in circuit with a three phase voltage source.

As illustrated in FIG. 1, a dc offset compensator 100 in accordance with an embodiment of the present invention can be connected in a circuit 8 with a three phase voltage supply 10 via a summation device 12 and a pickup 14. A switch 16, suitable for use in a multi-phase circuit, can be connected with a load having an inductance 18 and a resistance 20. It will be understood that the dc offset compensator 100 is preferably a single processor with at least one memory chip that is configured to accomplish the functions described below, although, it will be appreciated that the dc offset compensator may be composed of multiple processors and/or a combination of multiple processors and discreet electronic components capable of carrying out the functions described in detail below. The dc offset compensator 100, senses the output current iT, which is comprised of a dc component iDC and a positive sequence fundamental component iP. The compensator 100, must extract the dc component, iDC, of the sensed current iT, and compute a compensating voltage ΔV that is summed at summation device 12 with the output voltage from the voltage source 10 in order to eliminate the dc component iDC of the output current iT. In particular, the summation device 12, in a known manner, may effect control signal level and be implemented through inverter logic whereupon changes in the inverter output voltage level may be effected in order to eliminate the dc component.

Figure 2:
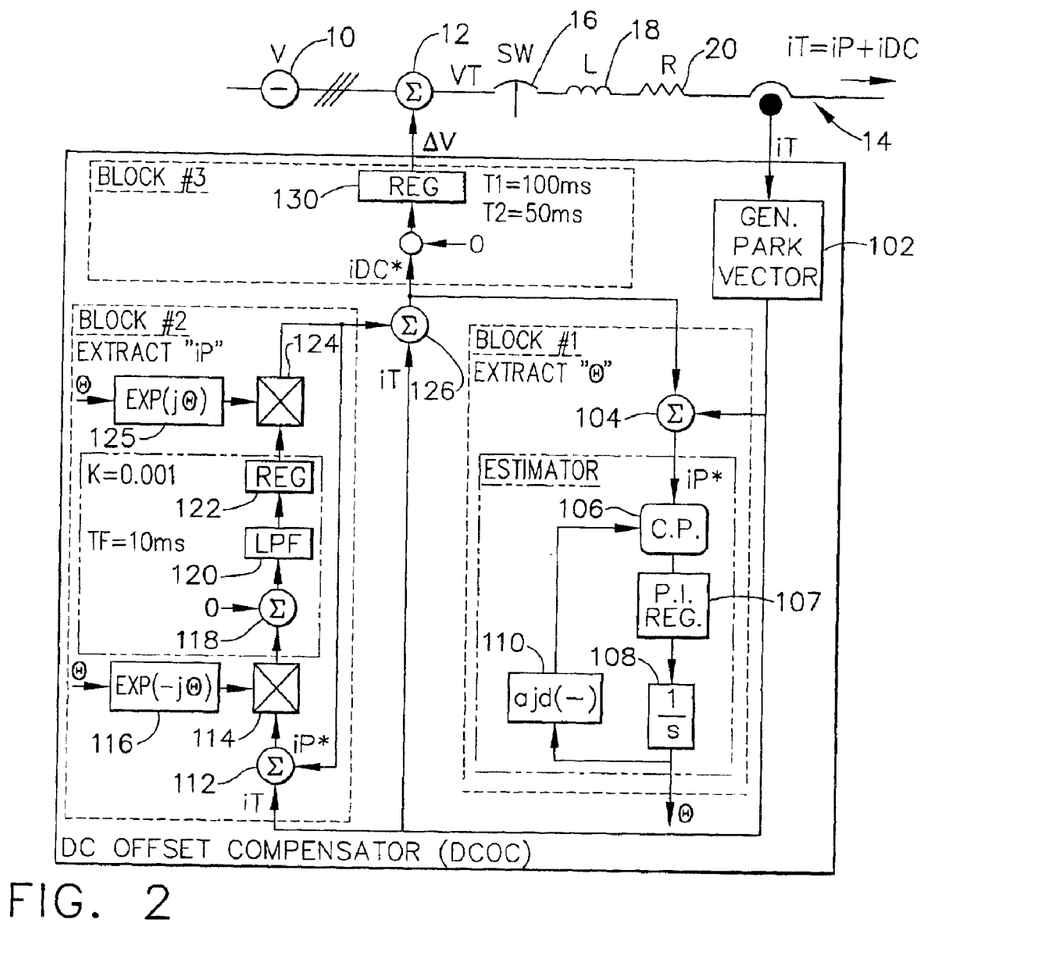
FIG. 2 is a schematic diagram showing further details of the dc offset compensator of FIG. 1.

Referring now to FIG. 2, the dc offset compensator 100 receives input from the pickup 14 in the form of a current sample in a well-known manner and is converted into a current "Park vector." A Park vector, in general, is a mathematical representation that describes the locus of an electrical quantity in the complex space domain (where time is a parameter). A general discussion of Park vectors can be found in P. K. Kovacs, "Transient Phenomena in Electrical Machines," Elsevier Science Publishing Co. (1984).

In accordance with the present embodiment, a current Park vector can be generated at 102 from the current sample having three phases comprising a phase current A, a phase current B, and a phase current C. In particular, the current Park vector may be generated using the formula:

$$iT = (\tfrac{2}{3})(Ia + (a)(Ib) + (a^2)(Ic))$$

where a=exp(j2π/3), Ia equals the amplitude of the phase current A (Ia=I sin(wt)), Ib equals the amplitude of the phase current B (Ib=I sin(wt+π/3)) and Ic equals the amplitude of the phase current C (Ic=I sin(wt+2π/3)) and w=frequency and t=time.

Figure 3:
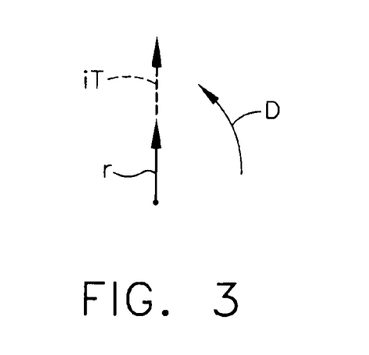
FIG. 3 is a vector diagram of a Park vector and a rotating vector rotating at a frequency corresponding to the three phase voltage source in accordance with the first embodiment.

Under a balanced positive sequence set of currents, the current Park vector has a constant amplitude equal to the peak current of the phase currents, and conventionally rotates at a frequency (w) in a counter-clockwise direction (D) as shown in FIG. 3. For an unbalanced set of currents, the park vector is represented as the sum of two balanced counter rotating Park vectors of different amplitudes. In the extreme case where the unbalance is such that one phase current is zero, both counter rotating vectors have equal magnitudes. For additional details of the foregoing see U.S. Pat. No. 6,201,715 to Huggett et al., entitled "Control scheme for synchronous frame regulators to mitigate DQ errors under unbalanced conditions", assigned to the assignee hereof and the entire contents of which is incorporated herein by reference.

As is known to those skilled in the art, a co-ordinate transformation, discussed above, may require the use of a rotating unit vector (r) that is in alignment with the current Park vector. Referring again to FIG. 3, a rotating unit vector (r) may be developed in a known manner using the formula:

$$r = \exp(j\theta)$$

where θ equals an angle of the vector.

However, in accordance with the present embodiment, the rotating unit vector (r) requires synchronization with the positive sequence current vector (iP) as described in more detail below.

Referring now to Block # 1 of FIG. 2, the total measured current vector (iT) can be conducted to a summation 104 where an estimated dc offset current vector (iDC*) is subtracted from the total measured current vector (iT) to obtain a first estimated positive sequence current vector (iP*). In order to synchronize an estimated rotating unit vector (r*), where (r*=exp(jθ*) and θ* is an estimated angle, with the first estimated positive sequence current vector (iP*), a vector cross product of the first estimated positive sequence current vector (iP*) and the estimated rotating vector (r*) can be calculated at 106. As is known from vector algebra, the cross product of two vectors is a third vector at right angles to the plane of the first two vectors and the sign of the cross product indicates which vector is leading or lagging the other. Here, where the sign indicates that the estimated rotating vector (r*) is lagging the first estimated positive sequence current vector (iP*), then the vector cross product is operated upon by a regulator 107, whose output (rotating frequency) increases accordingly. The regulator 107 may be a Pi regulator that is configured to produce a signal proportional to the electrical frequency of the input signal. The output signal from the regulator 107 is then integrated at an integrator 108 to produce the angle "theta" (Θ). The rotating vector (r*) is then computed at generator 110 from "theta" in accordance with the equation r=exp(j*Θ), and is fed back through generator 110, for use in calculating the vector cross product 106. If the rotating vector (r*) leads the current vector (iP*), the output frequency of the regulator 107 may be decreased. This decrease in electrical frequency may be integrated in the integrator 108, resulting in the two vectors (r* and iP*) closing in on one-another. As a result of this closed loop operation, the rotating vector (r*) becomes co-linear with the current vector (iP*). If there is no dc content at the output of summation 104, the two vectors (iP*) and (r*) will not only be co-linear, the angle theta will linearly increase with time. If there is a dc content contained in the output of summation 104, the vectors will be co-linear, but the angle theta will increase in a nonlinear manner with respect to time. This latter situation is undesirable in that it will introduce other harmonics into the distribution system, and hence, the dc content is computed as explained in the following.

The Block #2 may comprise a summation 112 where the second estimated current vector iP** is subtracted from the total measured current vector (iT) to obtain an error signal. This error signal is multiplied at multiplier 114 by the complex conjugate of the rotating unit vector (r*), generated at 116, and the output compared to zero at summing junction 118. Note that the output of the summing junction 118 contains a steady state component of the current in a synchronous reference frame, plus an undulating component at frequency w that represents the dc content. The summation of these signals is passed through a low pass filter (LPF) 120 to eliminate the undulating portion, and a regulator 122 whose output is then multiplied by the rotating vector (r*) generated from generator 125. The output of multiplier 124 represents an estimate of the current park vector (iP**), and is returned to the summing junction 112. Again the closed loop operation of this block assures that the fundamental current vector (iP*) represents the best estimate of the actual fundamental current vector (iP) that can be obtained using the estimated "theta". An improved estimate can now be achieved by first computing the dc offset current estimate by subtracting the estimated fundamental current vector (iP*) from the total measured current vector (iT) at summation 126, and subtracting this estimate from the total measured current vector (iT) at summation 104, at summation 104, so that an improved rotating vector (r*), with associated angle, "theta", is produced, which in turn allows an improved estimate (iP*) and (iP**) to be computed. In this manner, a rapidly converging value for both the dc content and the positive sequence fundamental is achieved.

In Block #3, the estimated dc offset current vector (iDC*) is first compared with zero and then passed to a voltage regulator 130 that can be provided to convert the estimated dc offset current vector (iDC*) to the dc voltage vector correction signal (ΔV). The dc voltage vector correction signal (ΔV) may be added at summation 12 to the three phase ac current signal from voltage source 10 thereby substantially reducing dc offset.

Figure 4:
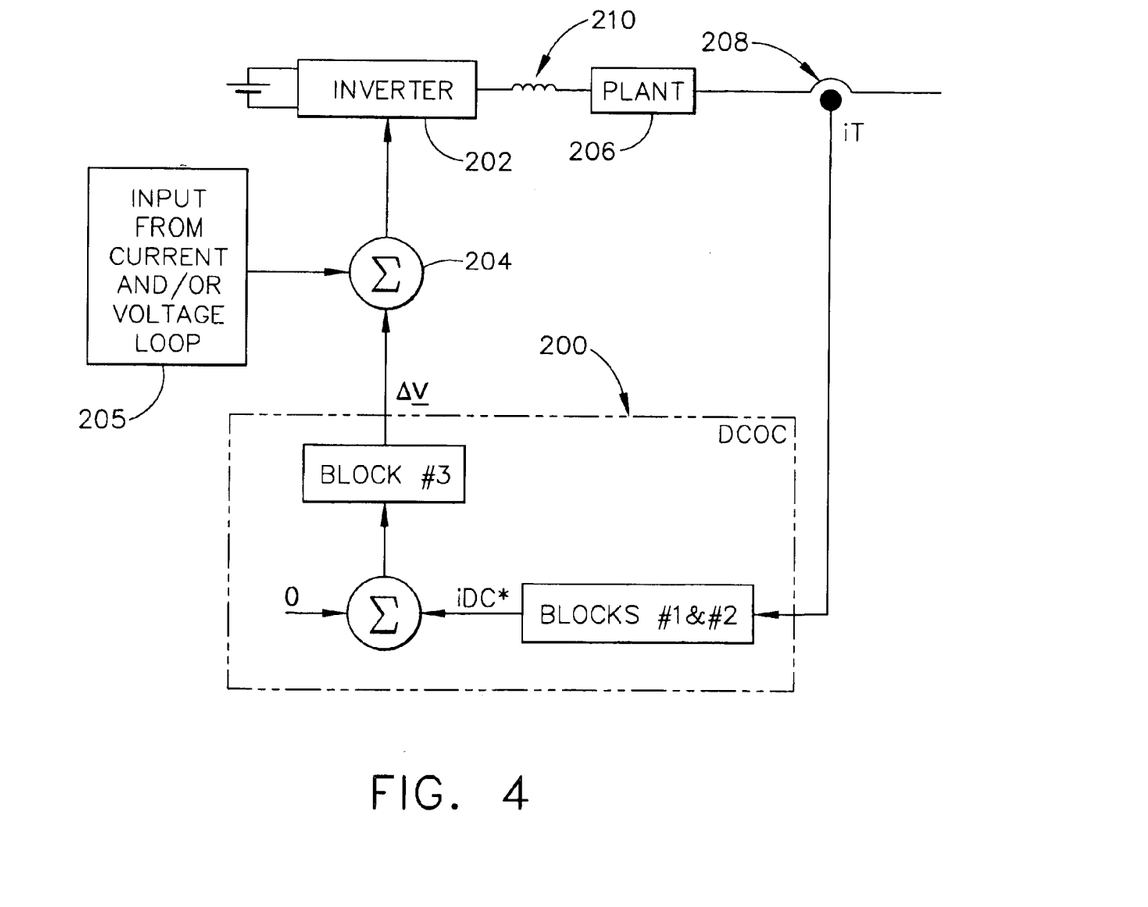
FIG. 4 is a schematic diagram of a dc offset compensator, which may be similar to that described in connection with FIGS. 1–3, connected in circuit with an inverter.

FIG. 4 illustrates a dc offset compensator 200, which is preferably similar to the dc offset compensator 100 described above, and can be connected in circuit with an inverter 202 via a summation 204. The summation 204 may also receive control input for the inverter from a current and/or voltage loop 205 in a known manner. The inverter 202 may be similar to that described in connection with U.S. Pat. No. 5,949,204 to Huggett et al, assigned to the assignee hereof, the entire contents of which is hereby incorporated herein by reference. A drive or plant 206, inductive filter 210 and a pick up 208, which may be similar to that described above, may also be connected in circuit with the inverter 202 in a known manner.

In operation, the inverter 202 can receive a dc voltage correction signal, such as is described above, from the dc offset compensator 200 and thereby adjust the output to substantially reduce or eliminate the dc offset from the ac current signal output from the inverter.

EXAMPLE

Referring again to FIGS. 1 and 2, the current transients of a three-phase voltage source 10, having a peak line voltage of approximately 100 volts and a frequency of (60) Hertz, were examined, subsequent to the closing of a switch 16, at a probe 22 to ascertain the effectiveness of a dc offset compensator 100 as described above. An inductive load 18 of 100 milliHenrys (L=100 mH), and a resistance load 20 of 0.4 ohm (R=0.4 ohm) were provided. It will be appreciated that with such a small resistance value, the transient current offset would decay at a very slow rate without a dc offset compensator since the natural time constant for a 60 Hz circuit is on the order of about 15 cycles.

Figure 5A:
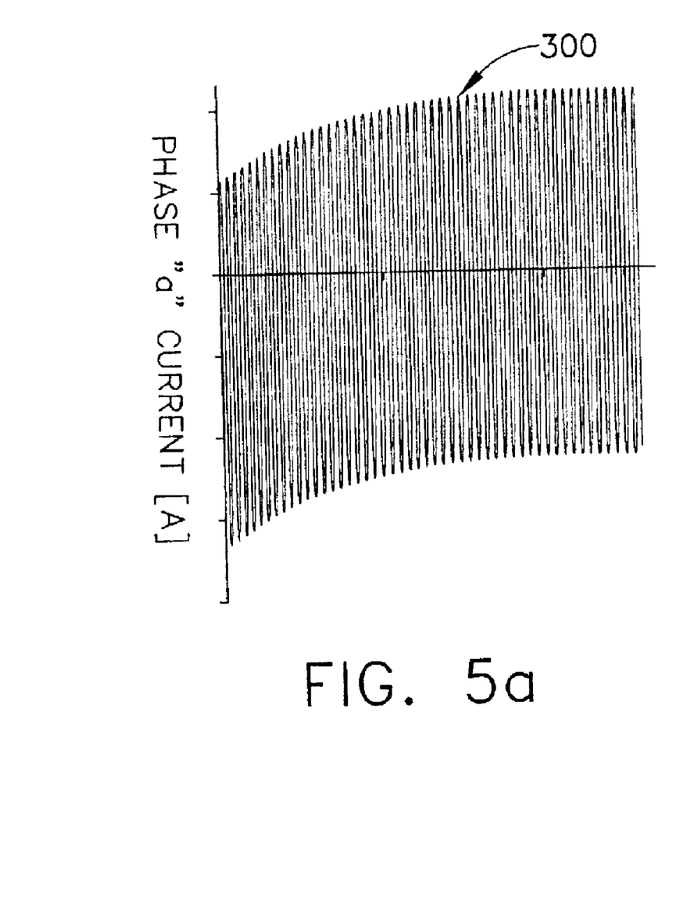
FIG. 5a is a graph showing a variation over time caused by an initial dc offset current in a phase "a" current from a three phase voltage source.
Figure 5B:
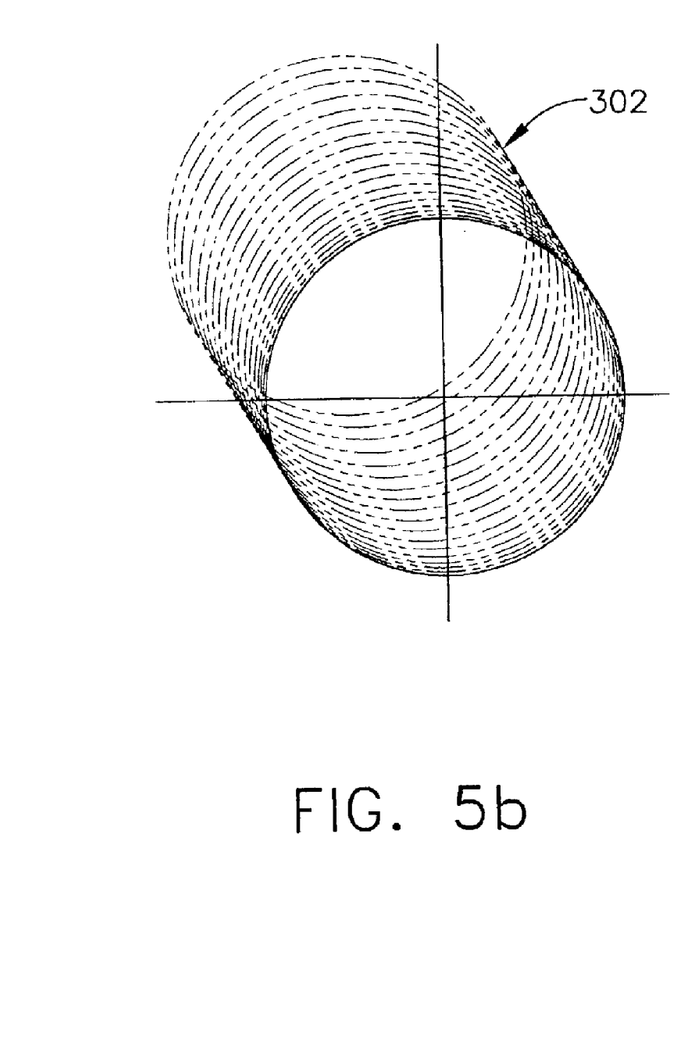

In order to determine how effective the dc offset compensator 100 is, three separate circuit arrangements were employed. First, the dc offset compensator 100 was turned "off" and the voltage source 10 was preset to function without a dc offset voltage and the output of the probe 22 was examined. As illustrated in FIGS. 5a and 5b, a waveform 300 and a Park vector locus 302 are seen to have a 2.5 Amp peak steady-state current. As described above, at initial conditions, a dc offset shown by a variation in the waveform occurs at the instant switch 16 is closed. In particular, a dc offset current having an initial offset of 2.5 Amps (shown more clearly in FIG. 5b) occurs. This represents an approximately 100% over-current peak value, that, for example, may saturate a magnetic circuit. Because of the very small resistance, the current offset will not decay completely for about 30–40 electrical cycles.

Figure 6A:
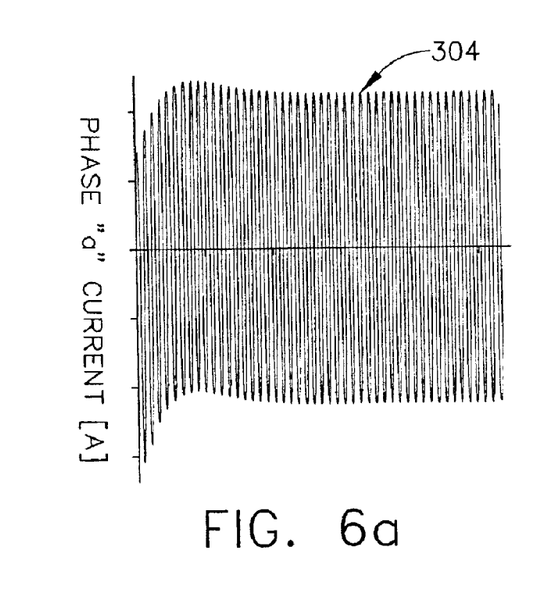
FIG. 6a is a graph showing a variation over time caused by an initial dc offset current in a phase "a" current from a three phase voltage source which has been corrected by a dc offset compensator in accordance with the present invention.
Figure 6B:
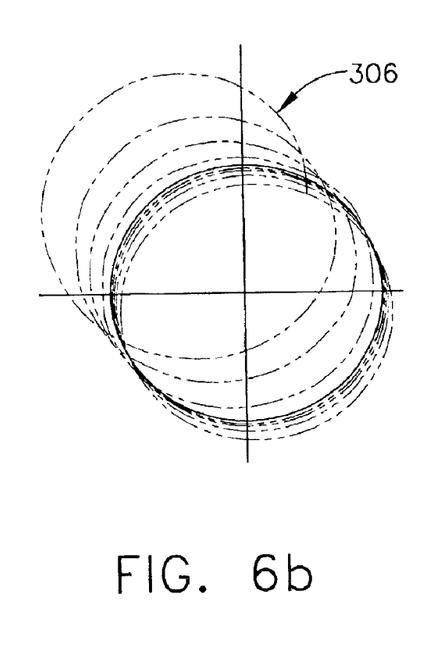
Figure 6C:
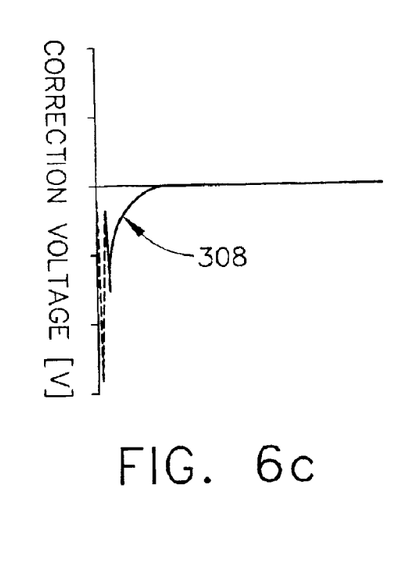
FIG. 6c is a graph showing a correction voltage applied by the dc offset compensator.

Next, a voltage source 10, again containing no dc offset voltage, was employed, although, in this case, the dc offset compensator 100 was turned "on". As illustrated in FIGS. 6a through 6c, and because of the dc offset compensator 100, an initial current offset of 2.5 Amps vanishes in approximately 3–4 electrical cycles (about 50 milliseconds) of a current waveform 304. In particular, the foregoing can be seen in both the current waveform 304 and its associated Park-vector locus 306. In addition, a correction voltage waveform 308 of a correction voltage vector, (ΔV), that is output from the dc offset compensator 100 is shown in FIG. 6c. The correction voltage waveform 308 indicates that the action of the dc offset compensator 100 will also reduce this signal to zero in about 3–4 electrical cycles.

Figure 7A:
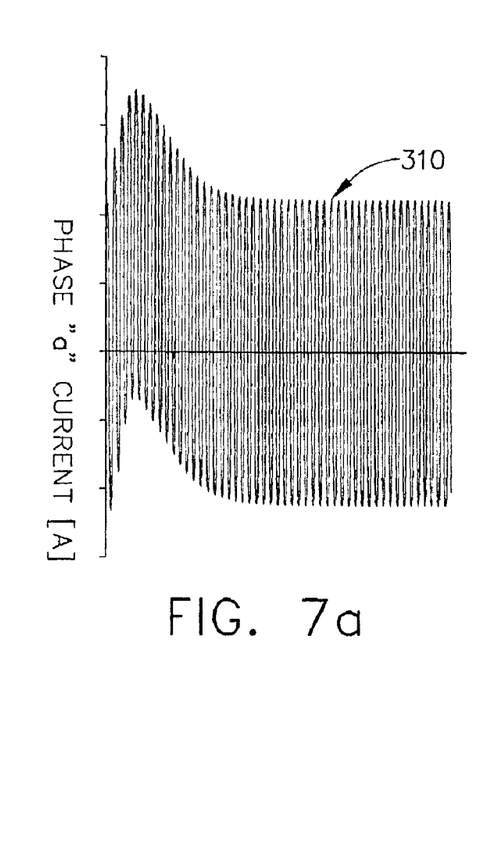
FIG. 7a is a graph showing a variation over time caused by an initial dc offset current along with a ten percent dc voltage offset in a phase "a" current from a three phase voltage source which has been corrected by a dc offset compensator in accordance with the present invention.
Figure 7B:
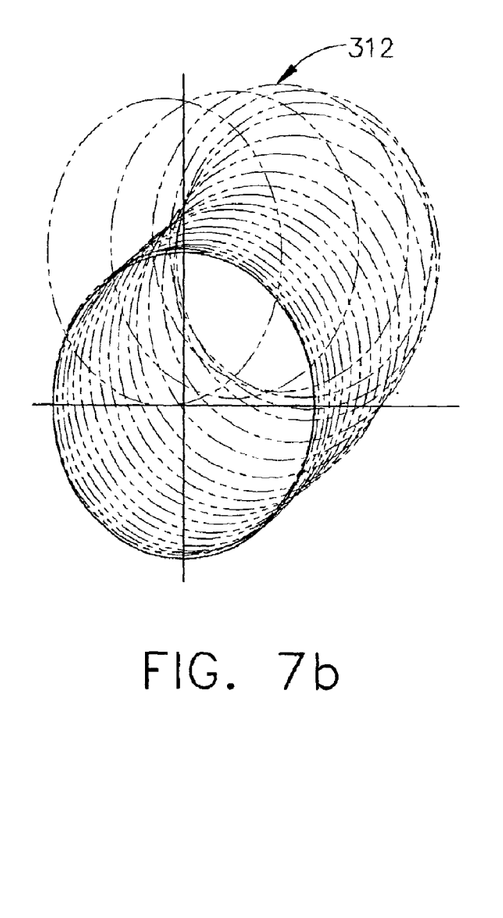
FIG. 7*b* is a vector diagram showing the variation in the phase "a" current of FIG. 7*a*.
Figure 7C:
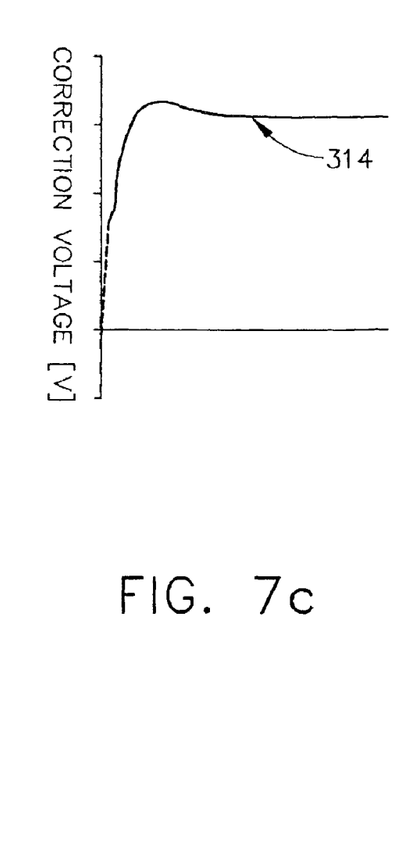
FIG. 7*c* is a graph showing a correction voltage applied by the dc offset compensator.

The output results of testing performed where the voltage source 10 contains both an initial dc current offset and a permanent ten percent dc voltage offset are illustrated in FIGS. 7a through 7c. The permanent ten percent dc voltage offset may be caused by, e.g., a non-synchronous modulating scheme, as discussed above, whereby the positive and negative half-cycles of the voltage source waveforms are unequal.

In order to correct for both the initial current offset and the permanent dc voltage offset, the dc offset compensator 100 may first address the dc offset current that is the result of, e.g., initial conditions, as described above. Next, the dc offset compensator 100 may move the voltage correction signal to a new level that takes care of the permanent dc offset in the voltage source. As illustrated in FIG. 7a, the settling time of waveform 310 increases over that shown in FIG. 6a. Likewise, the number of Park vector locus 312 varying increases from FIG. 6b to FIG. 7b. Where the permanent voltage correction is ten volts, shown at 314 in FIG. 7c, an additional 10 to 12 electrical cycles (150 to 180 milliseconds) is added to the settling time.

It should be understood, of course, that the foregoing relates to preferred embodiments of the invention and that modifications may be made without departing from the spirit and scope of the invention as set forth in the following claims.

We claim:

1. A method of compensating for dc offset in a three phase ac current signal, comprising the steps of:

providing a sample of the ac current signal;

generating a rotating vector (r) from the sample;

extracting a dc offset from the sample;

removing the dc offset from the ac current signal; and generating a Park vector representing a total measured current vector (iT) from the sample using the formula: iT=(⅔)(Ia+(a)(Ib)+(a2)(Ic)); where a=exp(j2π/3), Ia equals the amplitude of the phase current A (Ia=I sin(wt)), Ib equals the amplitude of the phase current B (Ib=I sin(wt+π/3)) and Ic equals the amplitude of the phase current C (Ic=I sin(wt+2π/3)) and w=frequency and t=time;

wherein the three phases of the ac current signal comprise a phase current A, a phase current B, and a phase current C.

2. The method of claim 1 wherein the step of generating a rotating vector (r) is carried out using the formula: r=exp (jθ*); where θ* equals a first estimated angle.

3. The method of claim 2 wherein the step of extracting a dc offset comprises the steps of:

subtracting a first estimated dc offset current vector (iDC*) from the total measured current vector (iT) to obtain a first estimated positive sequence current vector (iP*);

generating a vector cross product of the first estimated positive sequence current vector (iP*) and the rotating vector (r) to obtain an a vector cross product;

operating on the vector cross-product with a regulator to produce a signal proportional to the electrical frequency;

integrating the signal proportional to the electrical frequency to obtain a new estimated angle (θ**);

using the new estimated angle (θ**) in the step of generating a rotating vector (r);

subtracting the first estimated positive sequence current (iP*) from the total measured current (iT) to obtain an error signal;

multiplying the error signal by the complex conjugate of the rotator vector (r);

comparing the error signal to zero;

filtering the error signal to remove high frequency components so that the remaining signal is a dc voltage;

operating on the dc voltage signal with a regulator;

multiplying the output of the regulator by the rotating vector (r), thereby providing a new estimated positive sequence current (iP*);

subtracting the new estimated positive sequence current (iP*) from the total measured current vector (iT) to develop the first estimated dc offset current vector iDC* content of the ac current signal;

converting the first estimated dc offset current vector (iDC*) to a dc offset signal correction voltage indicative of the dc offset; and outputting the dc offset signal correction voltage.

4. The method of claim 3 wherein PI regulators are used during each of the steps of regulating the ac current signal.

5. The method of claim 3 wherein the source of the ac current signal is an inverter and the dc offset signal correction voltage is conducted to the inverter.

6. A method of compensating for dc offset in a three phase ac current signal comprising a phase current A, a phase current B, and a phase current C and comprising the steps of:

sampling the ac current signal;

generating a rotating vector (r) from the sample using the formula: r=exp(θ*); where θ* equals a first estimated angle;

generating a Park vector representing a total measured current vector (iT) from the sample using the formula: iT=(⅔)(Ia+(a)(Ib)+(a2)(Ic)); where a=exp(j2π/3), Ia equals the amplitude of the phase current A (Ia=I sin(wt)), Ib equals the amplitude of the phase current B (Ib=I sin(wt+π/3)) and Ic equals the amplitude of the phase current C (Ic=I sin(wt+2π/3)) and w=frequency and t=time;

extracting a dc offset from the sample by:

subtracting a first estimated dc offset current vector (iDC*) from the total measured current vector (iT) to obtain a first estimated positive sequence current vector (iP*);

generating a vector cross product of the first estimated positive sequence current vector (iP*) and the rotating vector (r) to obtain an a vector cross product;

integrating the vector cross product to obtain a second estimated angle θ**;

using the new estimated angle θ** in the step of generating a rotating vector (r);

subtracting the first estimated dc offset current vector (iDC) from the total measured current vector (iT) to obtain a second estimated positive sequence current vector (iP);

transforming the second estimated positive sequence current vector (iP) from a stationary reference frame into a synchronous reference frame by multiplying the second estimated positive sequence current vector (iP) by exp((j)(-θ**)) to obtain a transformed vector;

comparing the transformed vector to zero;

returning the transformed vector to the stationary reference frame by multiplying the transformed vector by exp(jθ) to again obtain the second estimated positive sequence current vector (iP);

subtracting the second estimated positive sequence current vector (iP**) from the total measured current vector (iT) to obtain the first estimated dc offset current vector (iDC*);

comparing the first estimated dc offset current vector (iDC*) to zero;

converting the first estimated dc offset current vector (iDC*) to a dc offset signal correction voltage indicative of the dc offset;

outputting the dc offset signal correction voltage; and removing the dc offset from the ac current signal by combining the dc offset signal correction voltage with the ac current signal.

7. The method of claim 6 wherein the source of the ac current signal is an inverter and the dc offset signal correction voltage is conducted to the inverter.

8. A dc offset compensator receiving as an input a three phase ac current signal comprising a phase current A, a phase current B, and a phase current C, and providing as an output a dc offset signal correction voltage, the compensator comprising:

a processor configured to sample the ac current signal, to generate a rotating vector (r) from the sample, extract a dc offset from the sample, to generate a dc offset signal correction voltage from the dc offset, and to generate a Park vector representing a total measured current vector (iT) from the sample;

wherein the processor generates a Park vector using the formula: iT=(⅔)(Ia+(a)(Ib)+(a2)(Ic)); where a=exp(j2π/3), Ia equals the amplitude of the phase current A (Ia=I sin(wt)), Ib equals the amplitude of the phase current B (Ib=I sin(wt+π/3)) and Ic equals the amplitude of the phase current C (Ic=I sin(wt+2π/3)) and w=frequency and t=time.

9. The dc offset compensator of claim 8 wherein the processor generates a rotating vector (r) using the formula: r=exp(θ*); where θ* equals a first estimated angle.

10. A dc offset compensator of receiving a three phase ac current signal as an input and providing a dc offset signal correction voltage as an output, comprising:
   a processor is configured to sample the ac current signal, to generate a rotating vector (r) from the sample, to extract a dc offset from the sample, and to generate a dc offset correction voltage from the dc offset,
   wherein the processor is configured in a first block to:
      generate a rotating vector (r) based on a first estimated angle (θ*);
      generate a Park vector representing the total measured current vector (iT) from the total measured current;
      subtract an estimated a dc offset current vector (iDC*) from the total measured current vector (iT) to obtain a first estimated positive-sequence current vector (iP*);
      calculate a vector cross product of the first positive-sequence current vector and the rotating vector (r); and
      integrate the vector cross product and output a second estimated angle (θ**);
   the processor is configured in a second block to receive the total measured current vector (iT) and the estimated angle (θ**) and to:
      subtract the first estimated positive sequence current (iP*) from the total measured current (iT) to obtain an error signal;
      multiply the error signal by the complex conjugate of the rotator vector (r);
      compare the error signal to zero;
      filter the error signal to remove high frequency components so that the remaining signal is a dc voltage;
      operate on the dc voltage signal with a regulator;
      multiply the output of the regulator by the rotating vector (r), thereby providing a new estimated positive sequence current (iP*);
      subtract the new estimated positive sequence current (iP*) from the total measured current vector (iT) to develop the first estimated dc offset current vector iDC* content of the ac current signal;
      convert the first estimated dc offset current vector (iDC*) to a dc offset signal correction voltage indicative of the dc offset; and
      output the dc offset signal correction voltage.

11. A dc offset compensator receiving a three phase signal from a source and providing a correction signal to an inverter, comprising:
   an input for receiving a total measured current from the source;
   a processor connected to the input and configured in a first block to:
      generate a rotating vector (r) based on a first estimated angle (θ*);
      generate a Park vector representing the total measured current vector (iT) from the total measured current;
      subtract an estimated a dc offset current vector (iDC*) from the total measured current vector (iT) to obtain a first estimated positive-sequence current vector (iP*);
      calculate a vector cross product of the first positive-sequence current vector and the rotating vector (r); and
      integrate the vector cross product and output a second estimated angle (θ**);
   the processor configured in a second block to receive the total measured current vector (iT) and the estimated angle (θ**) and to:
      subtract the first estimated positive sequence current (iP*) from the total measured current (iT) to obtain an error signal;
      multiply the error signal by the complex conjugate of the rotator vector (r);
      compare the error signal to zero;
      filter the error signal to remove high frequency components so that the remaining signal is a dc voltage;
      operate on the dc voltage signal with a regulator;
      multiply the output of the regulator by the rotating vector (r), thereby providing a new estimated positive sequence current (iP*);
      subtract the new estimated positive sequence current (iP*) from the total measured current vector (iT) to develop the first estimated dc offset current vector iDC* content of the ac current signal;
      convert the first estimated dc offset current vector (iDC*) to a dc offset signal correction voltage indicative of the dc offset; and
      output the dc offset signal correction voltage
   the processor configured in a third block to receive the total measured current vector (iT) and the estimated angle (θ**) and to:
      compare the first estimated dc offset current vector (iDC*) to zero; and
      convert the first estimated dc offset current vector (iDC*) to a voltage correction signal for input to the inverter.

12. The dc offset compensator of claim 11 wherein:
   the three phases of the ac current signal comprise a phase current A, a phase current B, and a phase current C; and
   the processor generates a Park vector using the formula: iT=(⅔)(Ia+(a)(Ib)+(a2)(Ic)); where a=exp(j2π/3), Ia equals the amplitude of the phase current A (Ia=I sin(wt)), Ib equals the amplitude of the phase current B (Ib=I sin(wt+π/3)) and Ic equals the amplitude of the phase current C (Ic=I sin(wt+2π/3)) and w=frequency and t=time.

13. The dc offset compensator of claim 11 wherein the processor generates a rotating vector (r) using the formula: r=exp(θ*); where θ* equals a first estimated angle.

14. The dc offset compensator of claim 11 wherein the processor is further configured in the first block to utilize a PI regulator configured to produce a signal proportional to the electrical frequency of the cross product.

15. The dc offset compensator of claim 11 wherein the processor is further configured in the second block to utilize a PI regulator to produce a signal proportional to the electrical frequency of the dc voltage signal.

16. The dc offset compensator of claim 12 wherein the processor is further configured to produce a dc voltage offset signal.

* * * * *